(12) United States Patent  (10) Patent No.: US 7,973,912 B2
Petrov et al.  (45) Date of Patent: Jul. 5, 2011

(54) BINARY MODULATION RANGEFINDER

(75) Inventors: Peter Petrov, Kirkland, WA (US); Yury Yakovlev, Fryazino (RU); Vladimir Grigorievsky, Fryazino (RU); Andrey Astrelin, Moscow (RU); Alex Sherstuk, Redmond, WA (US)

(73) Assignee: Basis Software, Inc., Redmond, WA (US)

( * ) Notice: Subject to any disclaimer, the term of this patent is extended or adjusted under 35 U.S.C. 154(b) by 136 days.

(21) Appl. No.: 12/551,949

(22) Filed: Sep. 1, 2009

(65) Prior Publication Data

US 2010/0066994 A1 Mar. 18, 2010

Related U.S. Application Data

(60) Provisional application No. 61/093,617, filed on Sep. 2, 2008.

(51) Int. Cl.
*G01C 3/08* (2006.01)
(52) U.S. Cl. ........................................ 356/5.1; 356/5.15
(58) Field of Classification Search ................ 356/4.01, 356/5.01; 382/106
See application file for complete search history.

(56) References Cited

U.S. PATENT DOCUMENTS

| 3,215,860 | A | | 11/1965 | Neumann |
| 4,075,698 | A | | 2/1978 | Lode |
| 4,396,916 | A | * | 8/1983 | Schnerk ........................ 342/103 |
| 4,470,698 | A | | 9/1984 | Green, Jr. et al. |
| 6,483,595 | B1 | | 11/2002 | Yakovlev et al. |
| 6,510,173 | B1 | | 1/2003 | Garmonov et al. |
| 6,940,599 | B1 | | 9/2005 | Hovde |
| 2003/0174926 | A1 | | 9/2003 | Oikawa et al. |
| 2003/0223053 | A1 | | 12/2003 | Liu et al. |
| 2006/0128503 | A1 | * | 6/2006 | Savarese et al. ............. 473/353 |
| 2007/0066967 | A1 | | 3/2007 | Sieckmann et al. |

* cited by examiner

*Primary Examiner* — Isam Alsomiri
(74) *Attorney, Agent, or Firm* — Pepper Hamilton LLP

(57) ABSTRACT

A method for evaluating distance from a first point to a second point. The method includes the steps of generating a periodic binary sequence, generating a harmonic modulation signal, generating a modulated light signal at a range finding device, wherein the modulated light signal is generated based upon the periodic binary sequence and the harmonic modulation signal, transmitting the modulated light signal from the first point toward an object at the second point, receiving a reflected light signal from the object, and determining a distance between the first point and the second point based upon a phase evaluation of periodic binary sequence and harmonic modulation signal of both the transmitted light signal and the received light signal.

17 Claims, 6 Drawing Sheets

202

203

BINARY MODULATION RANGEFINDER

CROSS REFERENCE TO RELATED APPLICATIONS

This application claims the priority benefit of U.S. Provisional Application No. 61/093,617 filed Sep. 2, 2008.

BACKGROUND

This document relates to distance evaluation devices that may be used for image acquisition, and more specifically to distance evaluation devices configured to capture images using a modulated signal.

The conversion of geometric data may be accomplished by the repetitive measuring of the distance between the surface and a known position using a device with an electrical/electronic output. Early computerized measuring machines (hereafter CMM's) used mechanical probes, which were repetitively advanced into contact and retracted from a surface to determine the distance between the surface and a known location.

More recent devices have used a beam of light to determine the distance between the source and the surface. In U.S. Pat. No. 4,470,698 to Green, Jr., et al., a system is shown which uses a reflected beam of light for measuring distances. The Green reference is directed towards a system for optimally determining the orientation of counter-rotating optical wedges used to direct a beam of light for scanning purposes.

The prior art measurement of phase shift used in an application such as described in the Green patent relies on mixing the measured signal with a reference frequency signal, and determining the frequency difference. The phase difference is measured as a time difference between zero-crossing transitions of the measured periodic signal. Any noise in the system, however, may result in errors in the measured time difference. In order to obtain sufficient accuracy, the measurement of a particular distance must be either prolonged or repeated multiple times to allow averaging of the time values to minimize the effect of any noise. The resulting impact on the system is an increase in the time required to obtain accurate distance measurements. When multiple measurements are required to derive a surface profile, and each measurement requires a longer dwell time, the overall scanning rate is reduced.

Also, in order to minimize the effect of noise on the signal measurement, band-pass filters may be employed. Band-pass filters cause limited bandwidth, which results in time domain distortions of the measured phase shift. Accommodating these distortions also results in a reduction of the rate at which distance measurements can be accurately obtained.

The nature of available photoreceivers also inserts uncertainty into the system. The signal delay of a photoreceiver is dependent upon the intensity of light received, and upon the distribution of the light intensity on the active surface of the receiver, which is defined by the angle between a scanning beam and an optical axis of the device.

In order to accommodate this dependence, it is necessary to know the phase, amplitude, and deflection angle of the light beam. As a result, measuring phase shift between electrical signals is not sufficient for accurate distance measurement. U.S. Pat. No. 6,483,595, which is hereby fully incorporated by reference, overcame the deficiencies of the prior art techniques, such as Green, by converting an output signal of the photoreceiver into a digitized signal, and comparing the digitized signal to a digitized reference differential signal corresponding to each generated light beam (or a single modulated light beam). However, due to safety regulations as well as due to technical properties of light emitting devices limiting overall energy use in generating a light beam, this approach has an inherent limitation on the overall number of frequency components that may be used in a modulated light beam, thereby reducing the accuracy of the measurements.

SUMMARY

The invention described in this document is not limited to the particular systems, methodologies or protocols described, as these may vary. The terminology used herein is for the purpose of describing particular embodiments only, and is not intended to limit the scope of the present disclosure.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In one general respect, the embodiments disclose a method for evaluating distance from a first point to a second point. The method includes the steps of generating a periodic binary sequence, generating a harmonic modulation signal, generating a modulated light signal at a range finding device, wherein the modulated light signal is generated based upon the periodic binary sequence and the harmonic modulation signal, transmitting the modulated light signal from the first point toward an object at the second point, receiving a reflected light signal from the object, and determining a distance between the first point and the second point based upon a phase evaluation of periodic binary sequence and harmonic modulation signal of both the transmitted light signal and the received light signal.

In another general respect, the embodiments disclose a device for evaluating distance to a point on an object for three-dimensional scanning, the device includes a master clock generator configured to produce a master clock signal, a binary modulation signal generator operably connected to the master clock generator and configured to produce a periodic binary sequence in sequence with the master clock signal, a harmonic modulation signal generator operably connected to the master clock generator and configured to produce a harmonic modulation signal in sequence with the master clock signal, a combiner operably connected to the binary modulation signal generator and the harmonic modulation signal generator, the combiner configured to receive the periodic binary sequence and the harmonic modulation signal, and to produce a modulation signal, a heterodyne signal generator operably connected to the master clock generator and configured to produce a reference modulation signal in sequence with the master clock signal, a transmitter operably connected to the combiner and configured to receive the modulation signal from the combiner and transmit the modulation signal toward the object, a receiver configured to receive any signals reflected by the object, and a programmable logical circuit operably connected to the receiver and configured to determine a distance between the device and the object based upon an evaluation and comparison of amplitudes and phases of the received signal and the reference modulation signal.

In another general respect, the embodiments disclose a method for evaluating distance from a first point to a second point for three dimensional scanning. The method includes the steps of generating a periodic binary sequence; generating a harmonic modulation signal; generating a modulated light signal at a range finding device, wherein the modulated light signal is generated based upon the periodic binary sequence and optionally the harmonic modulation signal; transmitting the modulated light signal from the first point toward an object at the second point; receiving a reflected light signal from the object; computing, at a computing device, correlations of the reflected light signal and the modulated light signal for multiple signal components; deriving, at the computing device, phase shifts for the periodic binary sequence and the harmonic modulation signal from the correlations; deriving, at the computing device, amplitude and uncorrected distance values based upon the phase shifts: computing, at the computing device, corrected distance values as a function of the amplitude of the reflected light signal, the angle between an axis of the transmitted modulated light signal and the object, and value and time-derivatives of an amplitude and phase of the reflected light signal and the modulated light signal; and storing, at a computer readable medium, information defining scanned point positions and scanned point brightness and reflectivity as determined for a first region of a light spectrum.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
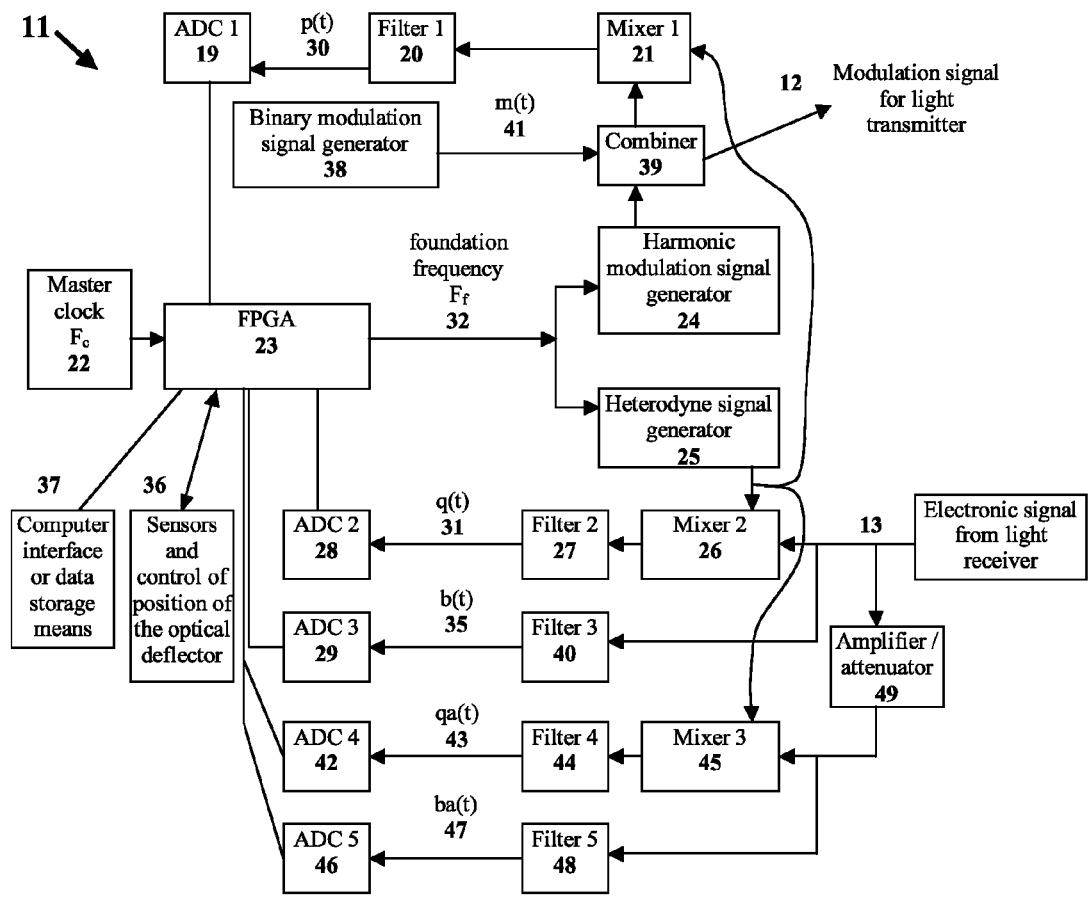
FIG. 1 illustrates various embodiments of a distance evaluation device.

FIG. 1 illustrates an exemplary distance evaluation device (DED) 11. The DED 11 may produce a modulated light signal 12 for transmission by a light transmitter. The DED 11 may include two main sets of components, a transmission set (e.g., harmonic modulation signal generator 24, combiner 39, mixer 21, filter 20, analog-to-digital converter 19 and binary modulation signal generator 38) and a receiving set (e.g., heterodyne signal generator 25, mixer 26, mixer 45, amplifier 49, filter 27, filter 40, filter 44, filter 48, analog-to-digital converter 28, analog-to-digital converter 29, analog-to-digital converter 42 and analog-to-digital converter 46). The DED 11 may further include a master clock generator 22 for producing a clock signal $F_c$ as well as a processor, or in this example, a field programmable gate array (FPGA) 23.

The FPGA 23 may output a foundation frequency $F_f$ 32. The FPGA 23 may transfer $F_f$ 32 to both the harmonic (or high frequency) modulation signal generator 24 as well as the heterodyne signal generator 25. Harmonic modulation signal generator 24 may be synchronized from the master clock generator 22 via foundation frequency signal 32 or other associated clock signal. To achieve optimum depth of modulation, the output signal level of the harmonic modulation signal generator 24 may be software/firmware controlled. The harmonic modulation signal generator 24 may be implemented as (but not limited to) a PLL frequency synthesizer or a crystal-controlled oscillator. Similarly, the heterodyne signal generator 25 may be synchronized from the master clock generator 22 via foundation frequency signal 32 or other associated clock signal. The heterodyne signal generator 25 may be implemented as (but not limited to) a PLL frequency synthesizer, a crystal-controlled oscillator, a binary modulation generator similar to binary modulation signal generator 38, or a plurality of PLL frequency synthesizers.

The output of the harmonic modulation signal generator 24 may be transferred to combiner 39 where it is added/combined with the output m(t) 41 of the binary modulation signal generator 38 to form a modulated signal 12. The binary modulation signal generator 38 may be implemented as (but not limited to) a Field Programmable Gate Array FPGA, a shift register, a parallel to serial code converter, or a RAM module with an address counter synchronized with the master clock generator 22. To achieve optimum depth of modulation, the output signal level of generator 38 may be software/firmware controlled.

A copy of modulated signal 12 may also be transferred to the mixer 21 where it may be combined or mixed with a copy of the output of the heterodyne signal generator 25. The output of the mixer 21 may be transferred to the filter 20 where excessive frequency components are removed. The resulting output of the filter 20 may be reference signal p(t). The reference signal p(t) may then be converted from analog to digital at the analog-to-digital converter 19 and transferred to the FPGA 23 for additional processing.

A similar data generation and creation path may be followed through the receiving components (e.g., heterodyne signal generator 25, mixer 26, mixer 45, amplifier 49, filter 27, filter 40, filter 44, filter 48, analog-to-digital converter 28, analog-to-digital converter 29, analog-to-digital converter 42 and analog-to-digital converter 46). The output of the heterodyne signal generator 25 may be combined or mixed with an electronic signal 13 received from a light receiver at the mixer 26. The output of the mixer 26 may be passed to the filter 27. The output of the filter 27, q(t), may be converted from analog to digital at the analog-to-digital converter 28 and passed to the FPGA 23. Similarly, a copy of the electronic signal 13 may bypass the mixer 26 and may be filtered at the filter 40. The output of the filter 40, h(t), may be converted from analog to digital at the analog-to-digital converter 29 and passed to the FPGA 23.

Another copy of the electronic signal 13 may follow a similar receive path as the path described above with the exception being the electronic signal may be amplified at the amplifier 49 before further processing. After amplification, a copy of the output of the amplifier 49 may be combined or mixed with a copy of the output of the heterodyne signal generator 25 at the mixer 45 and the output of the mixer 45 may be passed to the filter 44. The output of the filter 44, qa(t), may be converted from analog to digital at converter 42 and passed to FPGA 23. Similarly, a second copy of the output of amplifier 49 may bypass mixer 45 and may be filtered at filter 48. The output of filter 48, ba(t), may be converted from analog to digital at the analog-to-digital converter 46 and passed to the FPGA 23. It should be noted the path including the amplifier 49 is optional and is only shown by way of example.

Once the FPGA 23 has each of the signals (reference signal p(t), and received signals g(t), b(t), qa(t) and ha(t)), the FPGA may process the information to determine a distance between the light transmitting/receiving device and an object being measured. Information determined by the FPGA 23 may be output via signal path 37 to a computer or other storage means. This process is explained in greater detail in the discussion of FIGS. 2-9.

Figure 2:
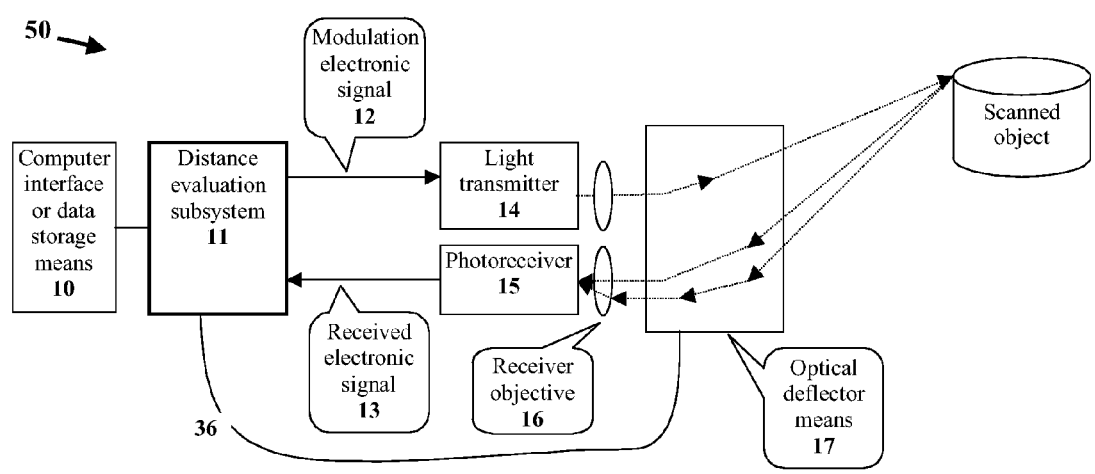
FIG. 2 illustrates various embodiments of a three-dimensional scanner including the distance evaluation device of FIG. 1.

FIG. 2 illustrates a three-dimensional scanner 50. The DED 11 may connect to a computer interface or data storage means 10 via signal path 37. The computer interface or data storage means 10 may be implemented as (but not limited to) an IEEE 1394 (Firewire) interface, universal serial bus (USB) interface, a flash memory, or various other types of computer readable media, interfaces or memory. The device may obtain status (deflection angles) of the optical deflector means 17, and may provide control for deflector 17 via signal path 36. The optical deflector means 17 may be implemented as (but not limited to) a combination of rotating mirrors with panoramic rotary stages with electronically controlled motors and sensors of rotation angles or position encoders. The DED 11 may produce and transmit an electronic modulation signal 12 to the light transmitter 14. The DED 11 may receive the electronic signal 13 from a light receiver 15. Transmitted and received electronic signals (12 and 13) as well as internal signal paths may be implemented as differential or non-differential signals, depending on any noise and crosstalk requirements.

Figure 3:
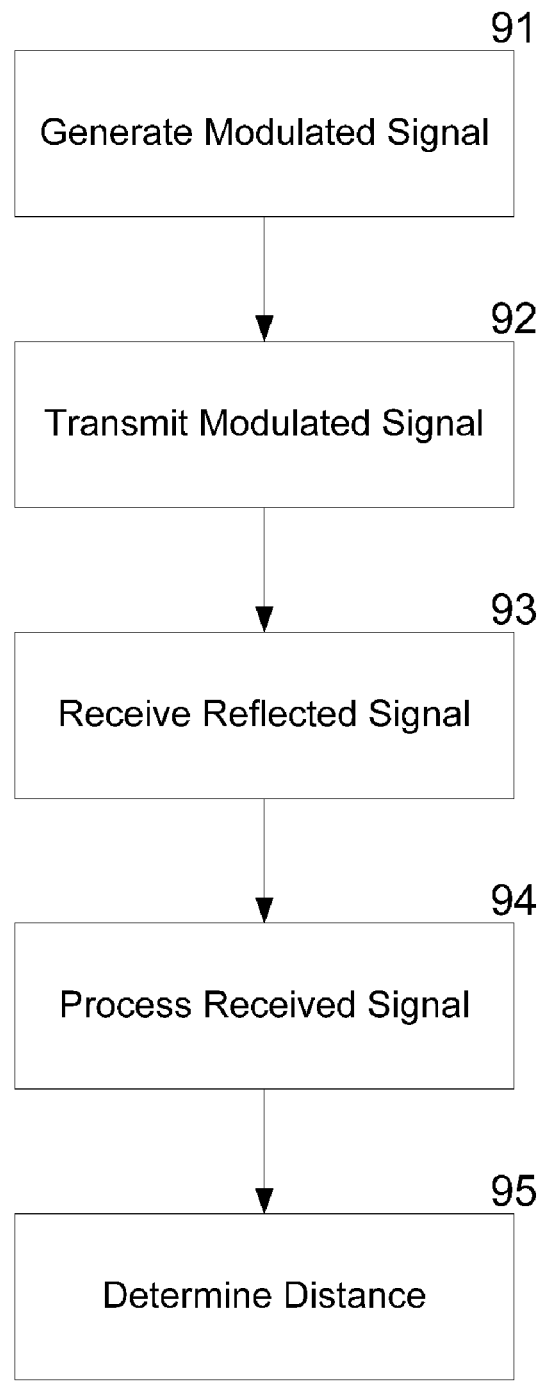
FIG. 3 illustrates an exemplary method flowchart for scanning a three dimensional object.

FIG. 3 illustrates an exemplary method for scanning a three dimensional object. As discussed above in the discussion of FIG. 1, the output m(t) 41 of binary modulation signal generator 38 may be combined with the output of harmonic modulation signal generator 24 to generate 91 a modulated signal. Once the signal is generated 91, the modulated signal may be transmitted 92 via light transmitter 14. The modulated light signal may reflect off the object and the reflected modulated signal may be received 93 at light receiver 15. The received signal may be processed 94 by the various mixers, filters and converters as discussed above in the discussion of FIG. 1, and passed to FPGA 23. The FPGA 23 may further process the various signals to determine 95 the distance between the three-dimensional scanner 50 and the object being scanned.

Determining 95 distance to each scanned point on the object may be based on computing a difference between the phases of the signal components of the outputs of two mixers (receiver mixer 26 and reference mixer 21) and the phases of the signal components of transmitted binary signal 38 and received filtered signal 35. The modulated signal may be mathematically treated as a composition of sinusoidal waves (or other basic functions which may be, but are not limited to: sine and cosine functions, meander functions, Walsh functions, Vilenkin-Krestenson functions, or pseudo-random sequences).

Phase may be evaluated as a convolution of a measured signal with other basic signals (which may be, but not limited to: sine and cosine functions, meander functions, Walsh functions, Vilenkin-Krestenson functions, pseudo-random sequences). Another resulting feature of the determining 95 may be an ability to measure reflectivity and brightness of the scanned points of three-dimensional objects. Details of the determining 95 will now be discussed in detail with exemplary equations and variables used to determine 95 the distance to each scanned point on an object.

Mathematically, the phase evaluation for each of components of the signal may be expressed via numerical computation of a pair of convolution (correlation) values for each measured signal w(t) (p(t), q(t), b(t)) according to the following exemplary equations:

$$S_{xi}^{w}(t) = \int_{i-\tau}^{t} w(r) \cdot \sin(2\pi \cdot F_i \cdot r) \cdot dr \quad \text{(eq. 200)}$$

$$S_{yi}^{w}(t) = \int_{i-\tau}^{t} w(r) \cdot \cos(2\pi \cdot F_i \cdot r) \cdot dr \quad \text{(eq. 201)}$$

wherein the variables are as follows:
i Number of signal component=0 . . . N
$F_i$ frequency of the i-th signal component.
  For a downconverted signal component, F=difference frequency=$F_{transmitted}$−$F_{heterodyne}$
τ Duration of scanning of 3D image element (time of integration)
w One of the following signals:
  P Reference mixer 26 output signal after filtering through 27
  Q Receiver mixer 21 output signal after filtering through 20
  B filtered non-downconverted received signal 35
  M Binary modulation signal 38
  Phase of the i-th component of signal w (which may be p(t), q(t), b(t), m(t)) may be obtained according to the following exemplary equation:

$$\phi_i^w(t) = \arctg(S_{xi}^w(t)/S_{yi}^w(t)) \quad \text{(eq. 202)}$$

Phase difference (phase shift) for the downconverted signal may be obtained as a difference between the phases of filtered outputs of two mixers (receiver mixer 21 and reference mixer 26) as shown in the following exemplary equation:

$$\Delta\phi_i(t) = \phi_i^q(t) - \phi_i^p(t) \quad \text{(eq. 203)}$$

Phase difference (phase shift) for the components of a non-downconverted signal may be calculated using known phase of the digital binary modulation generator 38 m(t) and measured phase for the received filtered signal 35 b(t) as shown in the following exemplary equation:

$$\Delta\phi_i(t) = \phi_i^b(t) - \phi_i^m(t) \quad \text{(eq. 204)}$$

Amplitude of received signal 31 (and similarly—for signal 35) may be estimated according to the following exemplary equation:

$$A^q(t) = \sqrt{\sum_i (S_{xi}^q(t))^2 + (S_{yi}^q(t))^2} \quad \text{(eq. 205)}$$

This amplitude value may be used for compensation of the phase/amplitude dependence. Additionally, the amplitude value may be used for evaluating reflectivity and brightness of the scanned points.

The distance L to the scanned point may be derived from the set of measured phase differences for basic signal components $\Delta\phi_i$ by finding the statistically most relevant solution for the following system of relations shown in the following exemplary equations:

$$L = \mu_i^* (\Delta\phi_i + K_i^* 2^* \pi) + \epsilon_i \quad \text{(eq. 206)}$$

$$L < L_{max} \quad \text{(eq. 207)}$$

where the variables are as follows:
i Number of signal component=0 ... N
$\mu_i$ coefficient, derived from the frequency of i-th signal component and propagation speed of light
$K_i$ An integer number of periods for i-th signal component
$\epsilon_i$ Measurement error for the i-th signal component
$L_{max}$ Maximum measured distance Methods for solving system of relations (eq. 206, eq. 207) may be based on (but not limited to) least squares method, e.g., finding L and $K_i$, such that $$\sum_{i=0}^{i=N} \epsilon_i^2$$

would be minimal.

Corrected distance may be evaluated in accordance with the following exemplary equation:

$$L_{corr}=L+\sigma L, \quad \text{(eq. 208)}$$

Correction value $\sigma L$, may be expressed with the following exemplary equation:

$$\sigma L = F(A^y, L, \alpha, \Gamma(A^q, \phi^q, A^p, \phi^p)) \quad \text{(eq. 209)}$$

wherein the variables are as follows:
F ( ... ) Function of multiple variables
$A^y$ amplitude of received signal
L Distance, as evaluated without correction value
$\alpha$ Angle between the axis of the scanner and direction to the scanned point
$A^q$ Amplitude of received signal
$\phi^q$ Phase of received signal
$A^p$ Amplitude of reference signal
$\phi^p$ Phase of reference signal
$\Gamma(A^q, \phi^q, A^p, \phi^p)$ A function of $A^q$, $\phi^q$, $A^p$, $\phi^p$ and of their time derivatives Binary modulation signal m(t) may be (but not limited to) generated in accordance with the following methods:

Method A: digitized sum of sinusoidal functions wherein m(t) may be calculated according to the following exemplary equation:

$$m(t) = \text{sign}\left(\sum_{i=0}^{i=N} C_i \cdot \sin(2\pi \cdot F_i \cdot t + \varphi_i)\right) \quad \text{(eq. 210)}$$

wherein the variables are as follows:
i Number of signal component=0 ... N
Fi frequency of the i-th signal component.
$C_i$ Relative amplitude of the i-th signal component
$\phi_i$ Phase of the i-th signal component Method B: logical XOR of meander functions wherein m(t) may be calculated according to the following exemplary equation:

$$m(t)=\text{meander}(F_1*t)\oplus\text{meander}(F_2*t)\oplus \ldots \quad \text{(eq. 211)}$$

Method C: sequence of U bits representing periodic binary modulation signal may be optimized in such a way that selected signal components occupy maximum part of the overall power of the signal spectrum. Optimization may be implemented (but not limited to) by evaluating spectrum for binary vectors of required length U. One possible implementation may be calculating a spectrum for each of $2^U$ possible binary vectors and selecting only those binary vectors that provide maximum spectral power for a selected set of frequency components.

Method D: a special class of periodic binary sequences which may have harmonics representing two or more target or fundamental frequencies F0, F1, ... Fn. The binary sequences are chosen, however, such that sequences do not produce harmonics representing a difference and a sum of the target frequencies, and also the difference and the sum of integer multiples of desired frequencies:

F0−F1

F0+F1

2*F0−F1

2*F0+F1

F0+2*F1

F0−2*F1

2*F0−2*F1

...

The periodic binary sequences having such spectral properties may be determined by calculating the frequency spectrum for each and every of $2^U$ possible binary vectors, and then selecting those vectors which provide zero (or minimal) spectral power for the difference and sum of integer multiples of desired frequencies such that any spikes due to the harmonics are greatly reduced or eliminated.

Figure 8:
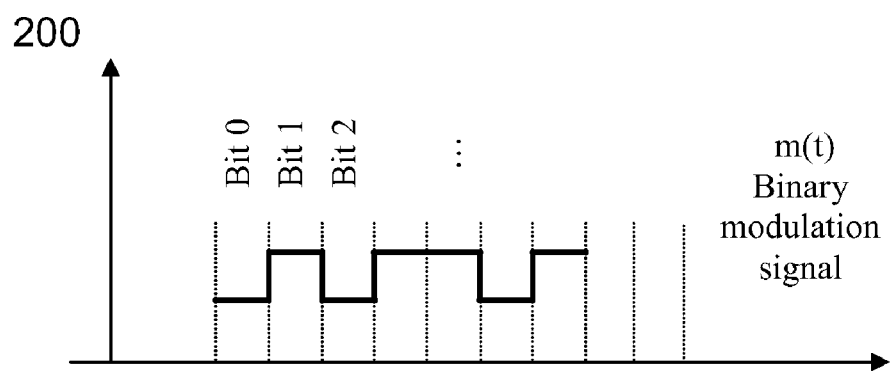
FIG. 8 illustrates a sample binary modulation signal.

Binary modulation signal m(t) 41 may be generated as a periodic bit sequence of length U with bit frequency Fb (with bit duration Tb=1/Fb). A sample binary modulation signal is illustrated in FIG. 8. Transmitted modulation signal 12 may be formed as a combination or sum of two generated signals (m(t) 41+output of harmonic modulation signal generator 24) or as one of them (either m(t) 41 or the output of harmonic modulation signal generator 24) depending on accuracy and performance requirements. Binary modulation sequence and signal frequencies may be chosen as described below, depending on accuracy and performance requirements, however the following methods are given by way of example only.

High frequency components of the modulation signal may be downconverted by mixer 21, providing reference signals for the phase shift measurements. High frequency components of the received signal may be downconverted by a mixer 26. Low frequency components of the received signal may be isolated by a filter 40. Each of three signals: "Receiver mixer output q(t)" 31, "Reference mixer output p(t)" 30, and "filtered received signal b(t)" 35 may be converted to digital code by an analog-to-digital converter and clocked by frequency Fa (analog-to-digital conversion period Ta=1/Fa). FPGA 23 may periodically (with period τ) performs numeric computation of phases for each of signal components in accordance with formulae (eq. 200 and eq. 201). Time of integration τ, signal component frequencies Fi and other frequencies may be chosen in such a way, that:

$$\tau = Kt/Fa \quad \text{(eq. 301)}$$

$$\tau = Kb*U/Fb \quad \text{(eq. 302)}$$

$$\tau = Ki/Fi \quad \text{(eq. 303)}$$

wherein the variables are as follows:
i Number of signal component=0 ... N
$F_i$ frequency of the i-th signal component.

For the downconverted signal components, F=difference frequency=$F_{transmitted}-F_{heterodyne}$ τ Duration of scanning of 3D image element (time of integration)
Fa A/D conversion frequency
Fb Bit frequency
Kt Integer number of A/D conversions per time of integration
Kb Integer number of bit modulation passes per time of integration
U Length of binary modulation sequence, expressed in bits Depending on accuracy and performance requirements, different types of frequency schemes may be used with the device and method disclosed, e.g., low frequency binary modulation and high frequency binary modulation.

In low frequency binary modulation mode signal components created by binary modulation may be chosen to be less than Fa/4, thus eliminating the need for down-conversion for these particular frequencies.

Exemplary values for signals in low frequency binary modulation mode may be:

| | |
|---|---|
| Fa = Fb = 77.76 MHZ | master clock |
| FF = Fa * 3120/360 = 673.92 MHZ | output of PLL generator 24. 3120 and 360 are coefficients for PLL frequency synthesizer. |
| FH = Fa * 3113/360 = 672.41 MHZ | output of heterodyne generator 25 (PLL generator is used in this case) |
| F0 = Fa * 7/360 = 1.51 MHZ | Signal 30 p(t) = result of downconversion of FF frequency using heterodyne frequency FH |
| F1 = Fa/8 = 9.72 MHz | First component of binary modulation produced by generator 38 |
| F2 = Fa/6 = 12.96 MHz | Second component of binary modulation produced by generator 38 |
| U = 24 | Length of binary modulation sequence (expressed in bits) |
| Kt = Kb = 360 = U * 15 | Number of A/D conversions per one period of integration |
| K0 = 7 | Number of cycles per integration for signal component 0 = downconverted frequency |
| K1 = 45 | Number of cycles per integration for signal component 1 = first component of binary modulation |
| K2 = 60 | Number of cycles per integration for signal component 2 = second component of binary modulation |
| τ = Kt/Fa = 4.63 μs | Duration of integration |
| Bit sequence = {1, 1, 1, 0, 0, 0, 0, 1, 1, 1, 0, 0, 1, 1, 0, 0, 0, 1, 1, 1, 1, 0, 0, 0} | Binary modulation bit sequence, based on formula (210) |

In a low frequency binary modulation with harmonics mode, generator 38 may produce a single meander signal. A meander function may have harmonics which are being used as additional frequency components.

Exemplary values for signals in low frequency binary modulation with harmonics mode may be:

| | |
|---|---|
| Fa = Fb = 77.76 MHZ | master clock |
| FF = Fa * 3024/360 = 653.18 MHZ | output of PLL generator 24. |
| FH = Fa * 3017/360 = 651.67 MHZ | output of heterodyne generator 25 (PLL generator is used in this case). |
| F0 = Fa * 7/360 = 1.51 MHZ | Signal 30 p(t) = result of downconversion of FF frequency using heterodyne frequency FH |
| F1 = Fa/20 = 3.888 MHz | Meander frequency |
| F2 = 3 * F1 = 11.664 MHZ | Third harmonic of meander |
| U = 20 | Length of binary modulation sequence (expressed in bits) |
| Kt = 360 = U * 18 | Number of A/D conversions per one period of integration |
| K0 = 7 | Number of cycles per integration for signal component 0 = downconverted frequency |
| K1 = 18 | Number of cycles per integration for signal component 1 = first component of binary modulation |
| K2 = 54 | Number of cycles per integration for signal component 2 = second component of binary modulation |
| τ = Kt/Fa = 4.63 μs | Duration of integration |
| Bit sequence = {1, 1, 1, 1, 1, 1, 1, 1, 1, 1, 0, 0, 0, 0, 0, 0, 0, 0, 0, 0} | Binary modulation bit sequence |

In high frequency binary modulation mode of operation, frequencies of signal components created by binary modulation may be chosen to be higher than Fa. Harmonic modulation signal generator 24, converter 29 and filter 40 may not be used in this mode. All signal components in this mode may originate from binary modulation. These signal components may be downconverted by mixers, using one heterodyne frequency, or a plurality of heterodyne frequencies. Particular values for frequency coefficients may depend upon performance of A/D converters and digital signal processing components available.

In this example, high frequency binary modulation carries 4 frequency components FT1, FT2, FT3, FT4. Heterodyne generator produces two frequencies FH0, FH1, which are used to downconvert two pairs of signal components: (FT1, FT2), (FT3, FT4). Exemplary values for signals in high frequency binary modulation mode may be:

| | |
|---|---|
| Fa = 77.76 MHz | master clock |
| Fb = Fa * 32 = 2488.32 MHZ | Bit frequency |
| FH0 = Fa * 3461/451 = 596.734 MHz | First output of heterodyne generator 25 (two PLL generators used for geterodyne in this case). |
| FH1 = Fa * 3851/451 = 663.977 MHz | Second output of heterodyne generator 25 |
| U = 902 | Length of bit sequence used for binary modulation |
| FT1 = Fb/U * 216 = 595.87 MHZ | First high frequency component of binary modulation. |
| FT2 = Fb/U * 217 = 598.63 MHz | Second high frequency component of binary modulation. |
| FT3 = Fb/U * 240 = 662.08 MHz | Third high frequency component of binary modulation. |
| FT4 = Fb/U * 243 = 664.84 MHz | Fourth high frequency component of binary modulation. |
| F1 = FT1−FH0 = Fa * (−5/451) = −0.862 | First downconverted signal component. |

-continued

| | |
|---|---|
| MHz | FH0 used as a heterodyne for the downconversion. |
| F2 = FT2−FH0 = Fa * (11/451) = 1.897 MHz | Second downconverted signal component. FH0 used as a heterodyne for the downconversion. |
| F3 = FT3−FH1 = Fa * (−17/451) = −2.931 MHz | Third downconverted signal component. FH1 used as a heterodyne for the downconversion. |
| F4 = FT4−FH1 = Fa * (31/451) = 5.345 MHz | Fourth downconverted signal component. FH1 used as a heterodyne for the downconversion. |
| Kt = 451 | |
| Kb = Kt * 32 = 14432 = U * 16 | |
| τ = Kt/Fa = 5.8 μs | |
| K1 = −5 | |
| K2 = 11 | |
| K3 = −17 | |
| K4 = 31 | |
| 11001100110011001111001100110011 0110011001100110011000111001100110011001100110011001100110011001100110011001100110011001100110011001101100110011001100110011001100110011001100110011 00110011001100110011000110011000 1100110011001100100110001100110 0110011100110011001100110011001100110011001100110011001100110011001100110011001100110011001100110011001100110011001100110011 00110011001100110011001100011100 1100110011001100110011000110001 100100110011001100110011001101101 100110011001100110011001001100011 0110011001101100110011011001011011 1001100100110011001100110011001100110011001100110011001100110011001100110011001100110011001100110011001100110011001100110011 0110011011001100110110011011001100110011001100110011001100110011001100110011001100110011001100110011001100110011001100110011 10011001001100110110011001100110 1100110011001101101001100110011 00101100110010011001100100110011 00110010011001100110010011001101 10011001100110011001001100110010 01100110011011001100110011001101 1001101100110011001100110011001100110011001100110011001100110011001100110011001100110011001100110011001100110011001100110011 0110010011001101100110011001100110011001100110011001100110011001100110011001100110011001100110011001100110011001100110011001 10011001001001100110011001100110 01100100111001110011001100110011 00110011001110011001100110011001 10001100110011001100110011001100 01100110011001110011001100110011 00110011001110011001100110011001 10011001100110001110011001100110 011001001100110011001100001100110011 001100 | Binary modulation bit sequence based on equation 210. |

It should be noted, depending on the sign of the difference between frequency component and heterodyne, downconverted signal frequency may be mathematically treated as a positive or as a negative value.

In periodic binary sequence generation mode, a periodic binary sequence of Method D may be combined with a harmonic modulation signal, however, the periodic binary sequence may be chosen such that the modulated signal does not have harmonics representing difference and sum of the target frequencies, and also difference and sum of integer multiples of desired frequencies such as:

F0−F1

F0+F1

2*F0−F1

2*F0+F1

F0+2*F1

F0−2*F1

2*F0−2*F1

...

One exemplary periodic binary signal may have harmonics representing two frequencies: F0=9.72 MHZ, F1=12.96 MHZ. This periodic binary signal may contain 3rd and 4th harmonics of the repeat frequency of the sequence itself (3.24 MHZ), which are used for "coarse" range finding and ambiguity resolution. However, the periodic binary signal does not have 1st, 2nd, 5th, 7th harmonics and it does not have harmonic numbers which are not multiples of 3 or multiples of 4. For example, it does not have harmonic 209, which would interfere with high frequency modulation. Exemplary values for generating a signal having a harmonic modulation component and a periodic binary signal component may be:

| | |
|---|---|
| Fa = Fb = 77.76 MHZ | master clock |
| FF = Fa * 3135/360 = 677.16 MHZ | output of PLL generator 24. 3135 and 360 are coefficients for PLL frequency synthesizer. |
| FH = Fa * 3128/360 = 675.648 MHZ | output of heterodyne generator 25 (PLL generator is used in this case) |

-continued

| | |
|---|---|
| F0 = Fa * 7/360 = 1.512 MHZ | Signal 30 p(t) = result of downconversion of FF frequency using heterodyne frequency FH |
| F1 = Fa/8 = 9.72 MHz | First component of binary modulation produced by generator 38 |
| F2 = Fa/6 = 12.96 MHz | Second component of binary modulation produced by generator 38 |
| U = 24 | Length of binary modulation sequence (expressed in bits) |
| Kt = Kb = 360 = U * 15 | Number of A/D conversions per one period of integration |
| K0 = 7 | Number of cycles per integration for signal component 0 = downconverted frequency |
| K1 = 45 | Number of cycles per integration for signal component 1 = first component of binary modulation |
| K2 = 60 | Number of cycles per integration for signal component 2 = second component of binary modulation |
| τ = Kt/Fa = 4.63 μs | Duration of integration |
| Bit sequence = {1, 1, 1, 0, 0, 0, 0, 1, 1, 0, 1, 0, 0, 1, 0, 0, 1, 0, 1, 1, 0, 0, 0, 0} | Binary modulation bit sequence, based on Method D. |

Computations in accordance with equations 200-209, and the selection of binary sequences according to Methods A-D may be implemented either in a software program for the Digital Signal Processor (DSP), or in an external processor program (for example, PC computer), or in a logic device, or all of that: using combination of DSP software program with a logic device (for example: DSP+Field Programmable Gate Array FPGA+additional software program in attached computer). To continue the above example, equations 200-209 may be implemented in FPGA 23.

Figure 4:
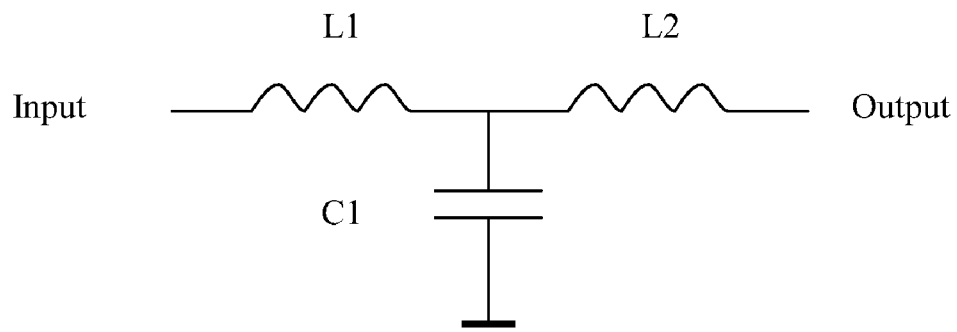
FIG. 4 illustrates various embodiments of an analog filter as used in the distance evaluation device of FIG. 1.

FIG. 4 illustrates an exemplary structure of a filter such as analog filters 20, 27, 40 of FIG. 1. The filters may be designed in such a way to pass signal components with frequencies Fi, and to suppress signal components with frequencies above Fa/2. Another feature of these filters may be that their effective bandwidth should be large when compared to $1/\tau$. For example, sample values for the filter components may be: L1=3.9E-6 H, C1=1.5E-9 F and L2=3.9E-6 H.

Figure 5:
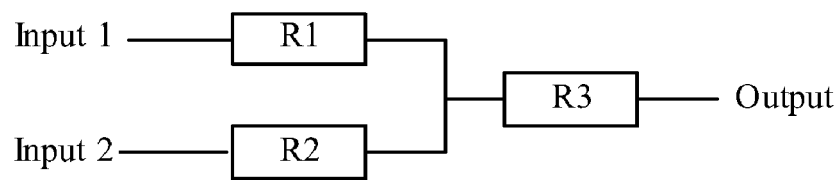
FIG. 5 illustrates various embodiments of a signal adder/combiner as used in the distance evaluation device of FIG. 1.

FIG. 5 illustrates an exemplary structure of a signal adder/combiner such as adder 39 of FIG. 1. Sample values for the adder components may be: R1=16.5 Ohm, R2=16.5 Ohm, and R3=16.5 Ohm.

Figure 6:
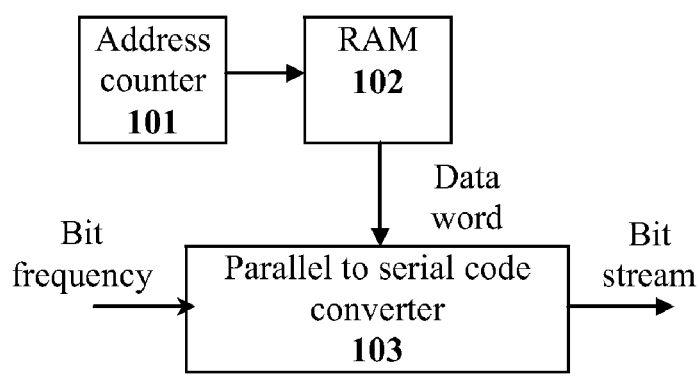
FIG. 6 illustrates various embodiments of a binary signal generator as used in the distance evaluation device of FIG. 1.

FIG. 6 illustrates an exemplary circuit used for binary signal generator implementation such as binary modulation signal generator 38 of FIG. 1. Binary signal generator may be implemented, but not limited to, as a combination of RAM with address counter and parallel to serial code converter. Specifically, address counter 101 steps through each address of RAM 102. As the counter 101 increases, a new data word may load from RAM 102 and pass to converter 103. Converter 103 may modulate the data word according to an incoming bit frequency and output the resulting modulated bit stream. All or some of the functional blocks of binary signal generator may be implemented as a part of an FPGA, or as separate semiconductor devices.

Figure 7:
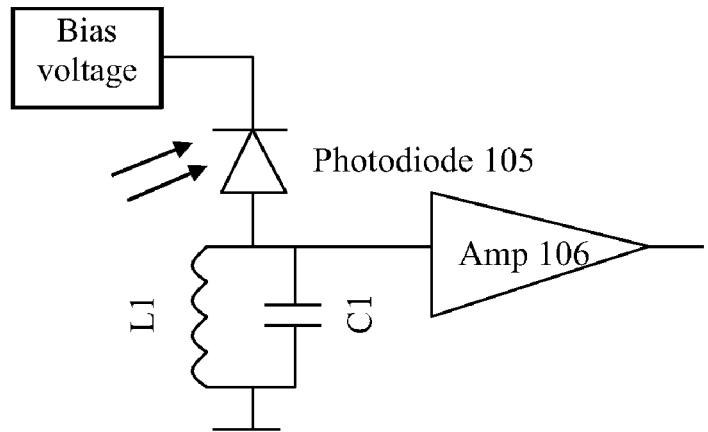
FIG. 7 illustrates various embodiments of an impedance matching circuit as used in a photoreceiver module of the three-dimensional scanner of FIG. 2.

FIG. 7 illustrates an exemplary impedance matching circuit for use in a photoreceiver such as photoreceiver 15 of FIG. 2. Due to reduced spectral width of transmitted and received signals achieved with binary modulation signal/noise ratio of the photoreceiver 15 may be improved by means of narrow bandwidth impedance matching between the photodiode 105 (or PMT, or other means of conversion of light energy to electric signal) and the amplifier 106. To achieve this, sample values for the photoreceiver components may be: L1=6 nH and C1=11 pF.

FIG. 8 illustrates an exemplary binary modulation signal 200, oscillating between two selected frequencies, one high frequency and one low frequency. As discussed above with reference to Method D, this binary signal may be a periodic binary signal selected such that harmonics representing the difference and the sum of the target frequencies of the modulated light signal are reduced or eliminated.

Figure 9A:
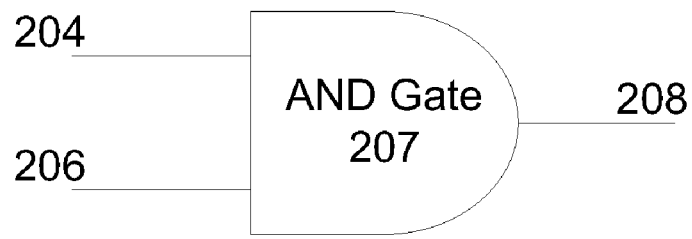
FIGS. 9a and 9b illustrate various embodiments of a combiner/envelope modulator.
Figure 9B:
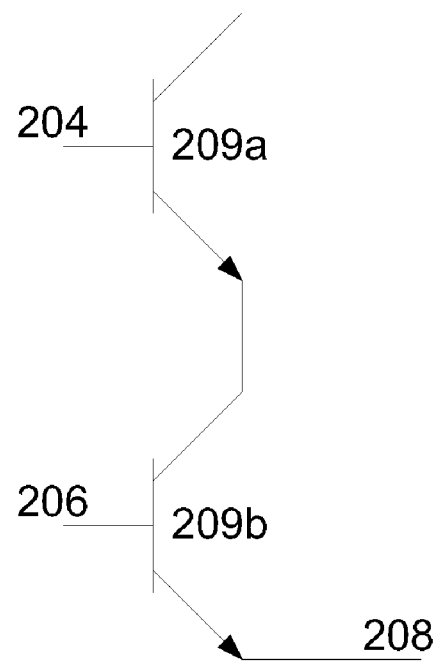

FIGS. 9a and 9b illustrate various embodiments of a combiner/envelope modulator. FIG. 9a shows combiner/envelope modulator 202. In this embodiment, input 204 and input 206 may combine at a logical AND gate 207 to produce output 208. Input 204 may be an envelope signal such as a binary sequence, and input 206 may be a high frequency modulation signal such as a meander oscillator output signal. The resulting output 208 may be an envelope modulated signal based upon both the binary sequence and the high frequency modulation signal.

FIG. 9b illustrates an alternative combiner/envelope modulator 203. The modulator 203 may include two serially connected transistors 209a and 209b. Input 204 may again be an envelope signal such as a binary sequence, and input 206 may be a high frequency modulation signal such as a sinusoidal oscillator output signal. The resulting output 208 may, as before, be an envelope modulated signal based upon both the binary sequence and the high frequency modulation signal.

Various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method for evaluating distance from a first point to a second point, the method comprising the steps of:
   generating a periodic binary sequence;
   generating a harmonic modulation signal;
   generating a modulated light signal at a range finding device, wherein the modulated light signal is generated based upon the periodic binary sequence and the harmonic modulation signal;
   transmitting the modulated light signal from the first point toward an object at the second point;
   receiving a reflected light signal from the object; and
   determining a distance between the first point and the second point based upon a phase evaluation of periodic binary sequence and harmonic modulation signal of both the transmitted light signal and the received light signal.

2. The method of claim 1, wherein the generating a periodic binary sequence comprises computing the periodic binary signal as a sign of a sum of at least two weighted sine functions.

3. The method of claim 1, wherein the generating a periodic binary sequence comprises computing the periodic binary signal as a result of a logical exclusive or of at least two binary meander functions.

4. The method of claim 1, wherein the generating a periodic binary sequence further comprises generating the periodic binary sequence such that useful signal components of the modulated light signal derived from the combination of the periodic binary sequence and the harmonic modulation signal occupy more than half of a power spectrum of the modulated light signal.

5. The method of claim 1, wherein the generating a periodic binary sequence comprises generating the periodic binary sequence such that a sum or difference of integer multiples of fundamental frequencies of the periodic binary sequence results in suppressed harmonics in the modulated light signal.

6. The method of claim 1, wherein the generating a periodic binary sequence comprises computing the periodic binary sequence as a result of a logical AND operation of a binary meander function and at least one of the following:
   a sign of a sum of at least two weighted sine functions;
   a logical exclusive or of at least two binary meander functions;
   a second binary sequence selected such that any signal components of the modulated light signal occupy more than half of a power spectrum of the modulated light signal; and
   a third binary sequence such that a sum or difference of integer multiples of the at least two frequencies of the modulated light signal results in suppressed harmonic signals in the modulated light signal.

7. The method of claim 1, wherein the generating a harmonic modulation signal comprises generating a high frequency modulation signal.

8. The method of claim 7, wherein the generating a high frequency modulation signal comprises generating an envelope modulation function selected based on the periodic binary sequence.

9. The method of claim 1, wherein the generating the periodic binary sequence comprises generating the periodic binary sequence such that the modulated light signal comprises at least two frequencies, the at least two frequencies representing a part of a power spectrum and determined to manage phase measurement and optional ambiguity resolution.

10. A device for evaluating distance to a point on an object for three-dimensional scanning, the device comprising:
    a master clock generator configured to produce a master clock signal;
    a binary modulation signal generator operably connected to the master clock generator and configured to produce a periodic binary sequence in sequence with the master clock signal;
    a harmonic modulation signal generator operably connected to the master clock generator and configured to produce a harmonic modulation signal in sequence with the master clock signal;
    a combiner operably connected to the binary modulation signal generator and the harmonic modulation signal generator, the combiner configured to receive the periodic binary sequence and the harmonic modulation signal, and to produce a modulation signal;
    a heterodyne signal generator operably connected to the master clock generator and configured to produce a reference modulation signal in sequence with the master clock signal;
    a transmitter operably connected to the combiner and configured to receive the modulation signal from the combiner and transmit the modulation signal toward the object;
    a receiver configured to receive any signals reflected by the object;
    a programmable logical circuit operably connected to the receiver and configured to determine a distance between the device and the object based upon an evaluation and comparison of amplitudes and phases of the received signal and the reference modulation signal.

11. The device of claim 10, wherein the harmonic modulation signal generator comprises an envelope function modulator operably connected to the master clock and configured to produce a high frequency modulation signal as an envelope function of the periodic binary sequence.

12. The device of claim 10, further comprising at least one of the following features:
    at least one attenuator or amplifier operably connected to the receiver;
    at least one mixer operably connected to the receiver;
    at least two analog filters operably connected to either the first or second mixers; and
    at least two analog to digital converters operably connected to the at least two analog filters.

13. The device of claim 10, wherein the receiver is a narrow bandwidth impedance matching photoreceiver.

14. A method for evaluating distance from a first point to a second point for three dimensional scanning, the method comprising the steps of:
    generating a periodic binary sequence;
    generating a harmonic modulation signal;
    generating a modulated light signal at a range finding device, wherein the modulated light signal is generated based upon the periodic binary sequence and optionally the harmonic modulation signal;
    transmitting the modulated light signal from the first point toward an object at the second point;
    receiving a reflected light signal from the object;
    computing, at a computing device, correlations of the reflected light signal and the modulated light signal for multiple signal components;
    deriving, at the computing device, phase shifts for the periodic binary sequence and the harmonic modulation signal from the correlations;
    deriving, at the computing device, amplitude and uncorrected distance values based upon the phase shifts;
    computing, at the computing device, corrected distance values as a function of the following variables:
        amplitude of the reflected light signal,
        angle between an axis of the transmitted modulated light signal and the object, and
        value and time-derivatives of an amplitude and phase of the reflected light signal and the modulated light signal; and
    storing, at a computer readable medium, information defining scanned point positions and scanned point brightness and reflectivity as determined for a first region of a light spectrum.

15. The method of claim 14 wherein the generating a harmonic modulation signal comprises generating a high frequency modulation signal.

16. The method of claim 15, wherein the generating a high frequency modulation signal comprises generating an envelope modulation function selected based on the periodic binary sequence.

17. The method of claim 14 wherein the generating the periodic binary sequence comprises generating the periodic binary sequence such that the modulated light signal comprises at least two frequencies, the at least two frequencies determined to manage phase measurement and ambiguity resolution.

* * * * *